(12) United States Patent
Okimura et al.

(10) Patent No.: US 10,731,597 B2
(45) Date of Patent: Aug. 4, 2020

(54) CYLINDER HEAD FOR INTERNAL COMBUSTION ENGINE

(71) Applicant: TOYOTA JIDOSHA KABUSHIKI KAISHA, Toyota-shi, Aichi-ken (JP)

(72) Inventors: Minoru Okimura, Toyota (JP); Atsushi Komada, Nagakute (JP); Yasuhiro Yamamoto, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/298,140

(22) Filed: Mar. 11, 2019

(65) Prior Publication Data

US 2019/0345892 A1 Nov. 14, 2019

(30) Foreign Application Priority Data

May 8, 2018 (JP) ................. 2018-090052

(51) Int. Cl.
| | | |
|---|---|---|
| *F02F 1/42* | (2006.01) | |
| *B23K 26/21* | (2014.01) | |
| *F02F 1/24* | (2006.01) | |
| *F02F 1/00* | (2006.01) | |
| *B23K 26/34* | (2014.01) | |

(52) U.S. Cl.
CPC ............ *F02F 1/4214* (2013.01); *B23K 26/21* (2015.10); *F02F 1/4285* (2013.01); *B23K 26/34* (2013.01); *F02F 2001/008* (2013.01); *F02F 2001/245* (2013.01); *F02F 2200/00* (2013.01)

(58) Field of Classification Search
CPC ............ Y02T 10/18; F01L 3/06; F02F 1/4235
USPC ............................................. 123/193.5, 308
See application file for complete search history.

(56) References Cited

U.S. PATENT DOCUMENTS

| | | | | |
|---|---|---|---|---|
| 5,423,300 A | * | 6/1995 | Ando ....................... | F02F 1/108 123/432 |
| 6,431,140 B1 | * | 8/2002 | Nishimura .............. | F02B 31/00 123/306 |
| 6,880,510 B2 | * | 4/2005 | Laimbock ............... | F02B 31/00 123/188.8 |
| 2001/0006056 A1 | * | 7/2001 | Ichikawa ................ | F02B 31/02 123/308 |
| 2004/0231638 A1 | * | 11/2004 | Tominaga ................. | F01L 3/06 123/308 |
| 2009/0000578 A1 | * | 1/2009 | Reustle .................. | B22D 25/02 123/41.82 R |

FOREIGN PATENT DOCUMENTS

| | | |
|---|---|---|
| EP | 1 028 247 A2 | 8/2000 |
| JP | 2000-230456 A | 8/2000 |
| JP | 2001-138080 A | 5/2001 |
| JP | 2015-048789 A | 3/2015 |

* cited by examiner

*Primary Examiner* — Long T Tran
*Assistant Examiner* — James J Kim
(74) *Attorney, Agent, or Firm* — Oliff PLC

(57) ABSTRACT

A cylinder head for an internal combustion engine, includes: first and second valves being intake valves or exhaust valves; a first circumferential wall portion defining a first port, the first port being opened and closed by the first valve and communicating with a combustion chamber; and a first overlay welded portion formed on the first circumferential wall portion and serving as a first valve seat on which the first valve is seated.

4 Claims, 7 Drawing Sheets

COMPARATIVE EXAMPLE

CYLINDER HEAD FOR INTERNAL COMBUSTION ENGINE

CROSS-REFERENCE TO RELATED APPLICATION

This application is based upon and claims the benefit of priority of the prior Japanese Patent Application No. 2018-090052, filed on May 8, 2018, the entire contents of which are incorporated herein by reference.

TECHNICAL FIELD

The present disclosure relates to a cylinder head for an internal combustion engine.

BACKGROUND

In a cylinder head for an internal combustion engine, an overlay welded portion is formed by supplying a melted metal material to an inner circumferential groove portion formed on an inner side of a circumferential wall portion defining a port, and this overlay welded portion serves as a valve seat. For example, in Japanese Unexamined Patent Application Publication No. 2015-048789, the overlay welded portion is formed by laser cladding process.

Meanwhile, the cylinder head is provided with a thick portion on a part of the circumferential wall portion in some cases, in order to ensure the rigidity against the combustion pressure. It is desirable to set the position of such a thick portion near the center of a combustion chamber on which high combustion pressure tends to act.

In the process of forming the overlay welded portion on the inner circumferential groove portion of the circumferential wall portion as described above, the melted material solidifies. In the vicinity of the thick portion of the circumferential wall portion as described above, more heat is transferred from the melted material to the thick portion, and the melted material solidifies in a relatively short time. In contrast, in the vicinity of a thin portion, it is difficult to release the heat from the melted material, and the melted material solidifies in a long time. The difference in time in which such a melted material solidifies might increase the residual stress of the overlay welded portion in the vicinity of the thick portion.

Also, the inner temperature of the combustion chamber increases during operation of the internal combustion engine, and the inner side of the combustion chamber is cooled when the internal combustion engine stops. Accordingly, the overlay welded portion is heated and cooled, and this temperature difference causes the thermal stress on the overlay welded portion. Such thermal stress increases in the center side of the combustion chamber, which tends to be high in temperature by combustion.

Therefore, if the position of the thick portion is set in the vicinity of the center of the combustion chamber, thermal stress in addition to the residual stress act on the overlay welded portion, so that the local stress might concentrate on the overlay welded portion. The local stress concentrates on the overlay welded portion formed as a valve seat in this manner, which might influence the durability.

SUMMARY

It is therefore an object of the present disclosure to provide a cylinder head for an internal combustion engine that suppresses local stress concentration on an overlay welded portion formed as a valve seat while ensuring rigidity against combustion pressure.

It is an object of the present disclosure to provide a cylinder head for an internal combustion engine, including: first and second valves being intake valves or exhaust valves; a first circumferential wall portion defining a first port, the first port being opened and closed by the first valve and communicating with a combustion chamber; and a first overlay welded portion formed on the first circumferential wall portion and serving as a first valve seat on which the first valve is seated, wherein the first circumferential wall portion includes a first thick portion in which a thickness of the first circumferential wall portion in a radial direction is partially increased, and the first thick portion is located in a center side of the combustion chamber with respect to a first line segment passing through both axes of the first and second valves, and in an opposite side of the center side of the combustion chamber with respect to a second line segment orthogonal to the first line segment and passing through the axis of the first valve, when viewed in a direction of the axis of the first valve.

Since the first thick portion of the first circumferential wall portion is located in the center side of the combustion chamber with respect to the first line segment, the rigidity against the combustion pressure is ensured. Further, since the first thick portion is located in the opposite side of the center side of the combustion chamber with respect to the second line segment, it is possible to separate a position, of the first overlay welded portion on which residual stress concentrates due to the first thick portion, away from the center side of the combustion chamber on which high thermal stress tends to act. It is thus possible to suppress the local stress concentration on the first overlay welded portion.

The first and second valves may be the intake valves.

The cylinder head for the internal combustion engine may further include: a second circumferential wall portion defining a second port, the second port being opened and closed by the second valve and communicating with the combustion chamber; and a second overlay welded portion formed on the second circumferential wall portion and serving as a second valve seat on which the second valve is seated, wherein the second circumferential wall portion may include a second thick portion in which a thickness of the second circumferential wall portion in a radial direction is partially increased, and the second thick portion may be located in the center side of the combustion chamber with respect to the first line segment, and in an opposite side of the center side of the combustion chamber with respect to a third line segment orthogonal to the first line segment and passing through the axis of the second valve, when viewed in a direction of the axis of the second valve.

The first thick portion may extend along the axis of the first valve in a direction away from the combustion chamber.

DETAILED DESCRIPTION

Figure 1:
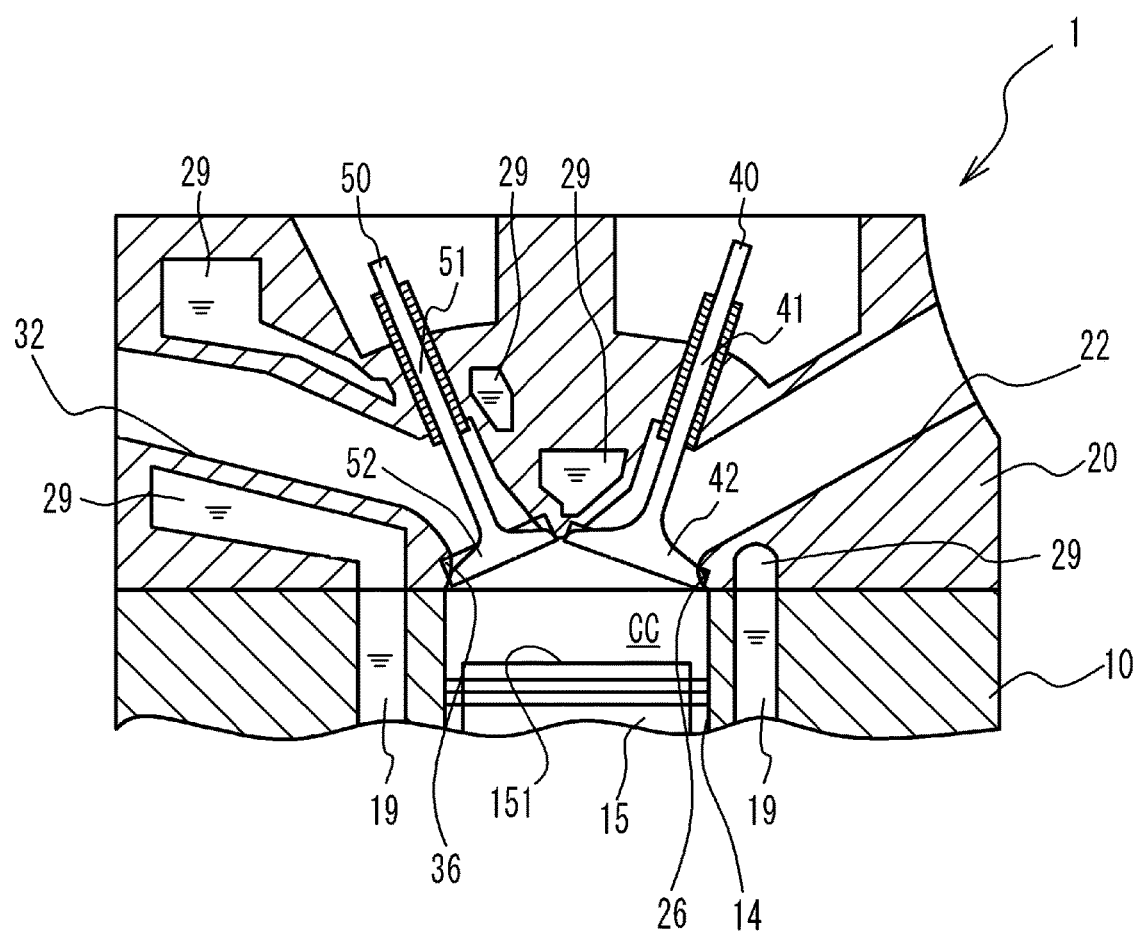
FIG. 1 is a partially cross-sectional view of an internal combustion engine.

FIG. 1 is a partially cross-sectional view of an internal combustion engine 1. The internal combustion engine 1 is, for example, a gasoline engine. The internal combustion engine 1 includes a cylinder block 10 and a cylinder head 20 assembled to an upper portion of the cylinder block 10. A plurality of cylinders 14 are formed within the internal combustion engine 1, and a piston 15 reciprocating in a predetermined range is provided within each cylinder 14. A combustion chamber CC in which an air-fuel mixture containing fuel and intake air is burned is defined between the cylinder head 20 and a top surface 151 of the piston 15. The cylinder head 20 is provided with intake ports 22, for introducing intake air into the combustion chamber CC, and exhaust ports 32, for exhausting exhaust gas from the combustion chamber CC. Further, the cylinder head 20 is provided with port injection valves (not illustrated) for injecting fuel into the respective intake ports 22 and ignition plugs (not illustrated) for igniting the air-fuel mixture in the respective combustion chambers CC. Water jackets 19 and 29 through which cooling water flows are formed within the cylinder block 10 and the cylinder head 20, respectively. For example, the water jacket 29 is formed within the cylinder head 20 around the intake ports 22, the exhaust ports 32, and the like.

The cylinder head 20 is provided with intake valves 40, for opening and closing the respective intake ports 22, and exhaust valves 50, for opening and closing the respective exhaust ports 32. The intake valve 40 includes a shaft portion 41 having a rod shape, and an umbrella portion 42 provided at an end of the shaft portion 41. The umbrella portion 42 expands radially outward from the shaft portion 41. Likewise, the exhaust valve 50 includes a shaft portion 51 and an umbrella portion 52. The intake port 22 is provided, at a downstream end thereof, with an overlay welded portion 26 on which the umbrella portion 42 of the intake valve 40 is seated. Likewise, the exhaust port 32 is provided, at an upstream end thereof, with an overlay welded portion 36 on which the umbrella portion 52 of the exhaust valve 50 is seated. The overlay welded portions 26 and 36 serve as valve seats. In the present embodiment, two pairs of the intake port 22 and the intake valve 40 are provided, and two pairs of the exhaust port 32 and the exhaust valve 50 are also provided.

Figure 2:
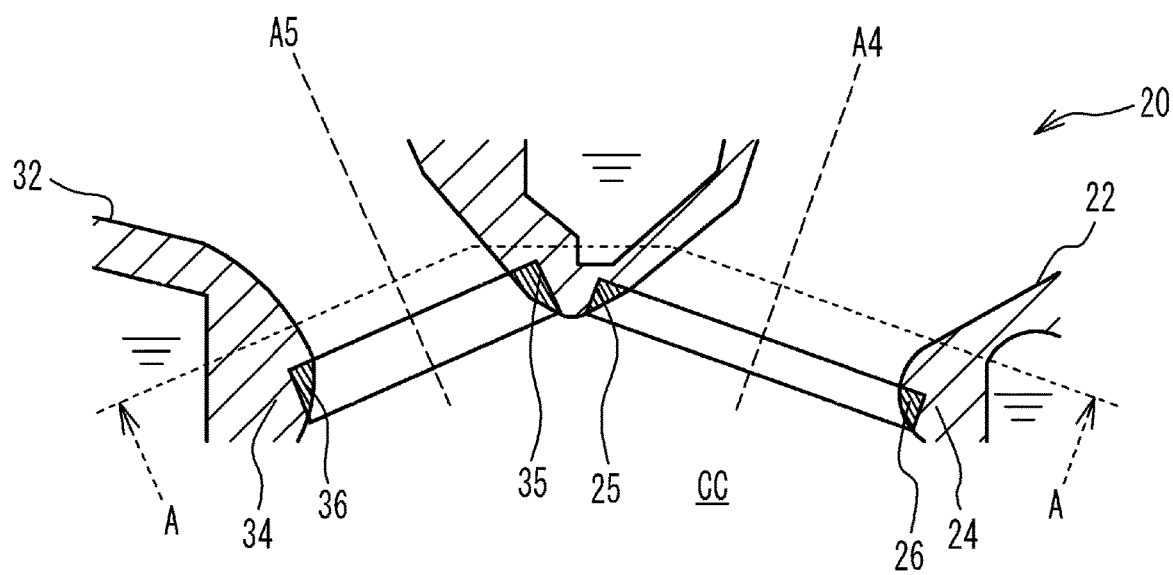
FIG. 2 is a partially enlarged view of a cylinder head.

FIG. 2 is a partially enlarged view of the cylinder head 20. In FIG. 2, the intake valve 40 and the exhaust valve 50 are omitted, but axes A4 and A5 along which the intake valve 40 and the exhaust valve 50 respective move are illustrated. A circumferential wall portion 24 is provided to define an opening end of the intake port 22 on the combustion chamber CC side. Likewise, a circumferential wall portion 34 is provided to define an opening end of the exhaust port 32 on the combustion chamber CC side. The inner circumferential sides of the circumferential wall portions 24 and 34 are respectively formed with inner circumferential groove portions 25 and 35 each having a substantially annular shape. The overlay welded portions 26 and 36 each having an annular shape are respectively formed on the inner circumferential groove portions 25 and 35. The overlay welded portion 26 is formed by the following method. Metal powder such as copper base alloy powder is supplied to the inner circumferential groove portion 25 while irradiating the inner circumferential groove portion 25 with laser light, and then the metal powder melted by the laser light is attached to the inner circumferential groove portion 25. Thereafter, the melted metal powder is cooled to solidify, which forms the overlay welded portion 26. Additionally, the method of forming the overlay welded portion with the laser beam as described above is referred to as laser cladding process. The method of forming the overlay welded portion 36 is also the same. The main body of the cylinder head 20 is made of an aluminum alloy different from the metal powder described above.

Figure 3:
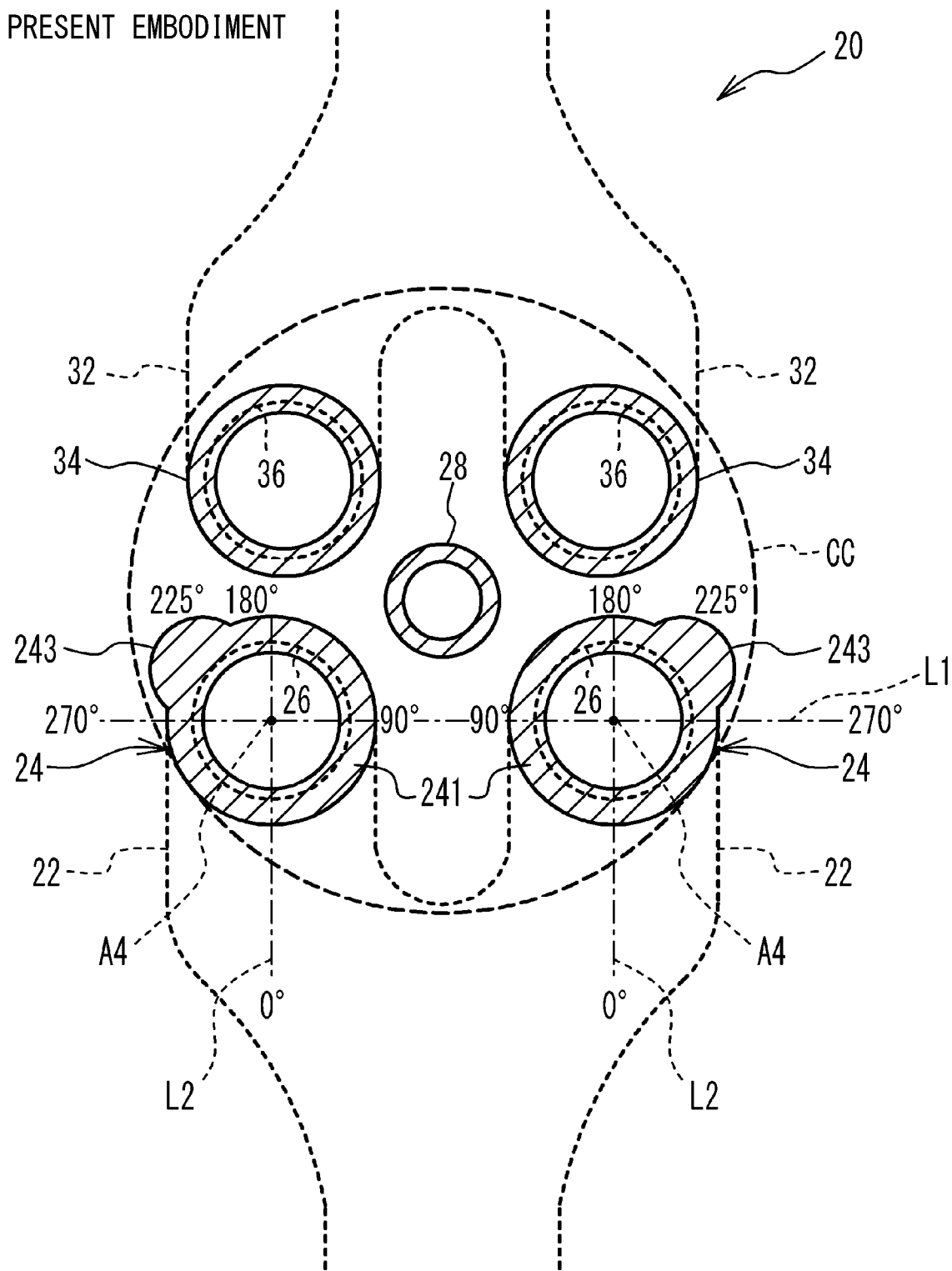
FIG. 3 is a cross-sectional view corresponding to line A-A of FIG. 2.

FIG. 3 is a cross-sectional view corresponding to line A-A of FIG. 2. The line A-A of FIG. 2 is perpendicular to the axes A4 and A5. FIG. 3 illustrates, by solid lines, the circumferential wall portions 24 around the respective overlay welded portions 26 on which the respective intake valves 40 are seated, the circumferential wall portions 34 around the respective overlay welded portions 36 on which the exhaust valves 50 are seated, and a hole portion 28 into which the ignition plug is inserted. FIG. 3 also illustrates, by broken lines, the combustion chamber CC, the intake ports 22, and the exhaust ports 32. FIG. 3 further illustrates a line segment L1 as an example of a first line segment passing through both the axes A4 of the two intake valves 40, a line segment L2 as an example of a second line segment orthogonal to the line segment L1 and passing through the axis A4 of one of the intake valves 40, and a line segment L2 as an example of a third line segment orthogonal to the line segment L1 and passing through the axis A4 of the other of the intake valves 40.

Moreover, FIG. 3 illustrates angular positions of the circumferential wall portion 24, specifically, a 0 degree position, a 90 degrees position, a 180 degrees position, and a 270 degrees position about each axis A4. The 0 degree position is located on the line segment L2 in an opposite side of the center side of the combustion chamber CC. The 90 degrees position is located on the line segment L1 in a side where the two adjacent circumferential wall portions 24 face each other. The 180 degrees position is located on the line segment L2 in the center side of the combustion chamber CC. The 270 degrees position is located on the line segment L1 in an opposite side of the side where the two adjacent circumferential wall portions 24 face each other. The hole portion 28 into which the ignition plug is inserted is located substantially at the center of the combustion chamber CC.

Herein, the circumferential wall portion 24 includes a thin portion 241, and a thick portion 243 thicker than the thin portion 241. The thick portion 243 is formed at a 225 degrees position between 180 degrees and 270 degrees. In other words, the thick portion 243 is located in the center side of the combustion chamber CC with respect to the line segment L1, and in the opposite side of the center side of the combustion chamber CC with respect to the line segment L2, when viewed in the direction of the axis A4. Herein, high combustion pressure tends to act on the center side of the combustion chamber CC with respect to the line segment L1, as compared with the opposite side of the center side of the combustion chamber CC with respect to the line segment L1. Since the thick portion 243 is formed at a position on which high combustion pressure tends to act in such a manner, the cylinder head 20 ensures the rigidity against the combustion pressure.

Figure 4:
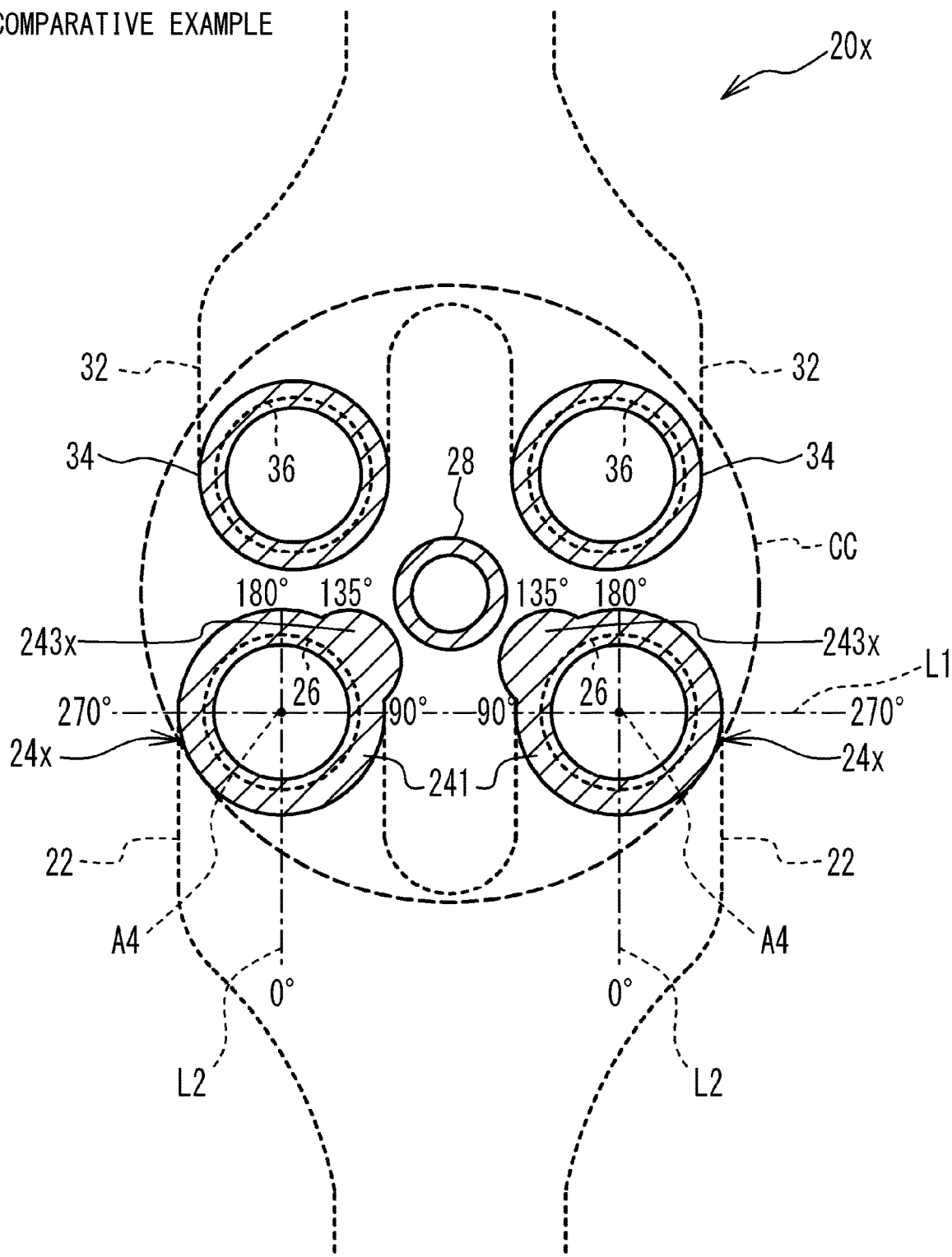
FIG. 4 is an explanatory view of a cylinder head of the comparative example.

Next, a comparative example will be described. FIG. 4 is an explanatory view of a cylinder head 20x of the comparative example. FIG. 4 corresponds to FIG. 3. Unlike the present embodiment, a thick portion 243x of a circumferential wall portion 24x of the cylinder head 20x is formed at a 135 degrees position. That is, the thick portion 243x in the comparative example is formed at a position close to the center of the combustion chamber CC, as compared to the thick portion 243 in the present embodiment.

Figure 5A:
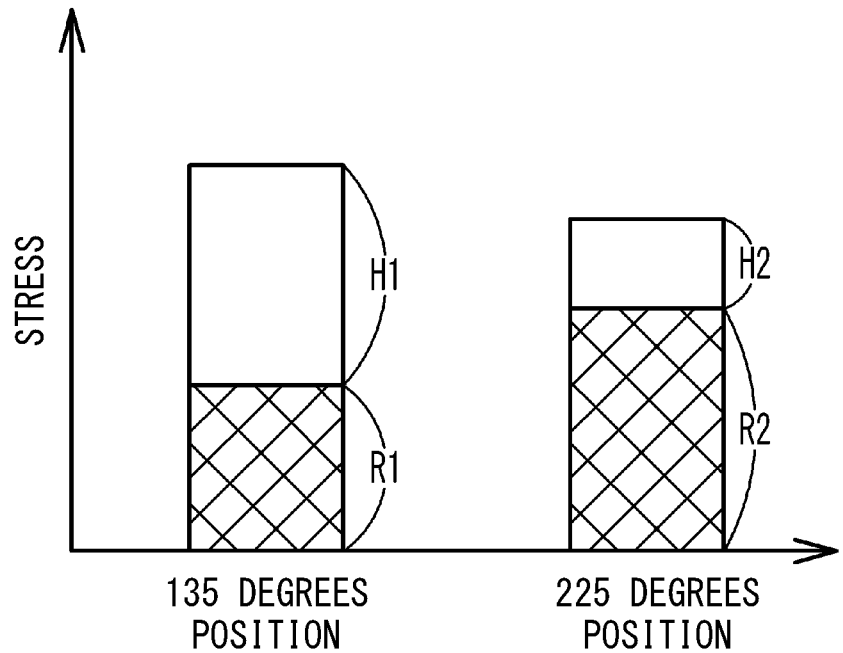
FIGS. 5A and 5B are graphs illustrating stress acted on an overlay welded portions at 135 and 225 degrees positions in the present embodiment and the comparative example, respectively.
Figure 5B:
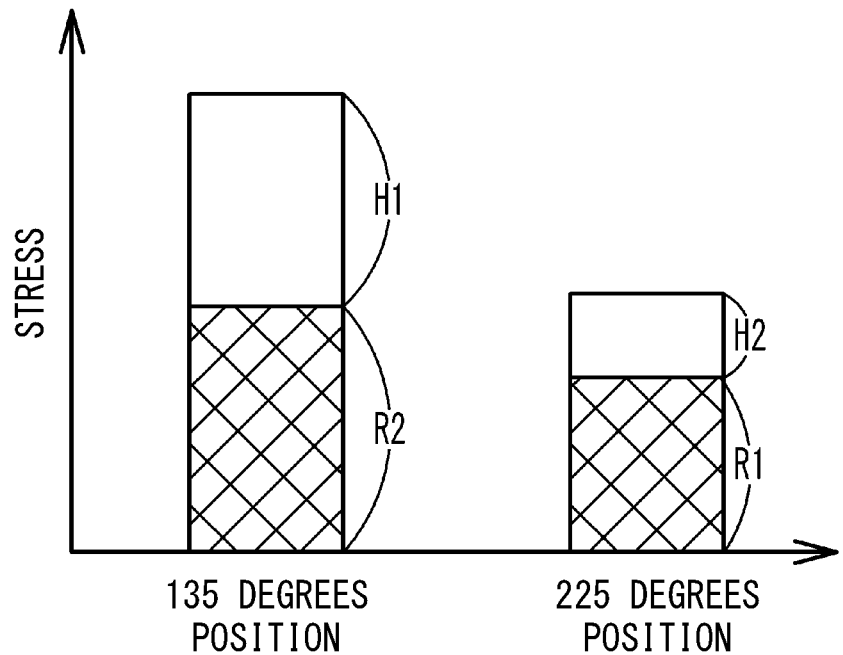

FIGS. 5A and 5B are graphs illustrating stress acted on the overlay welded portions 26 at the 135 and 225 degrees positions in the present embodiment and the comparative example, respectively. In both the present embodiment and the comparative example, thermal stress H1 acting on the overlay welded portion 26 at the 135 degrees position is higher than thermal stress H2 acting on the overlay welded portion 26 at the 225 degrees position. The reason for this is as follows. The overlay welded portion 26 is heated and cooled by the operation and stop of the internal combustion engine. This temperature difference causes thermal stress on the overlay welded portion 26. Herein, when the combustion is performed in the combustion chamber CC, the temperature of the 135 degrees position close to the center side of the combustion chamber CC is higher than that of the 225 degrees position.

Residual stress R1 on the overlay welded portion 26 at the 135 degrees position in the present embodiment is the same as the residual stress R1 on the overlay welded portion 26 at the 225 degrees position in the comparative example. Further, the residual stress R2 on the overlay welded portion 26 at the 225 degrees position in the present embodiment is the same as the residual stress R2 on the overlay welded portion 26 at the 135 degrees position in the comparative example. As will be described later in detail, the residual stress on the overlay welded portion 26 depends on each thickness of the circumferential wall portions 24 and 24x. Further, as described above, the thick portion 243 is provided at the 225 degrees position in the present embodiment, whereas the thick portion 243x is provided at the 135 degrees position in the comparative example. Herein, the residual stress R2 on the overlay welded portion 26 in the vicinity of each of the thick portions 243 and 243x is higher than the residual stress R1 on the overlay welded portion 26 in the vicinity of the thin portion 241. The reason for this is considered as follows.

Figure 6A:
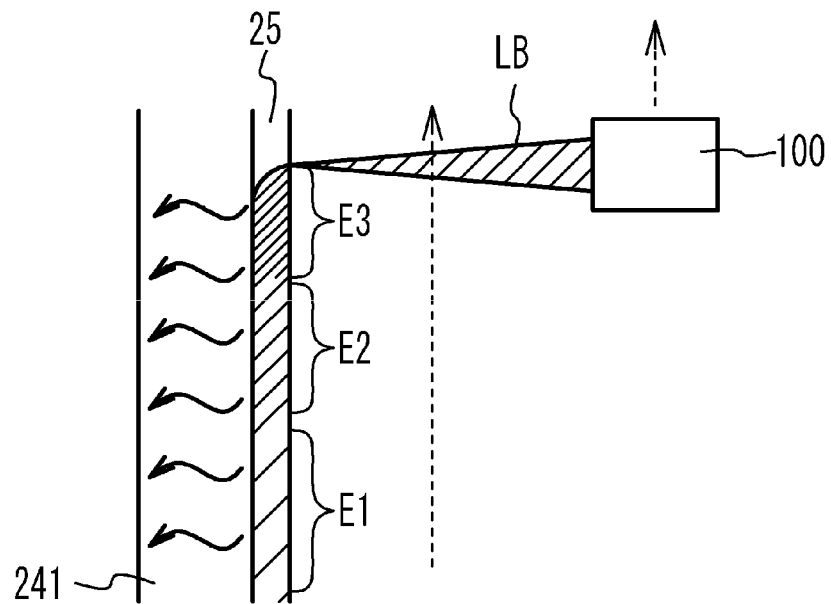
FIGS. 6A and 6B are explanatory views of an increase in residual stress in the vicinity of a thick portion.
Figure 6B:
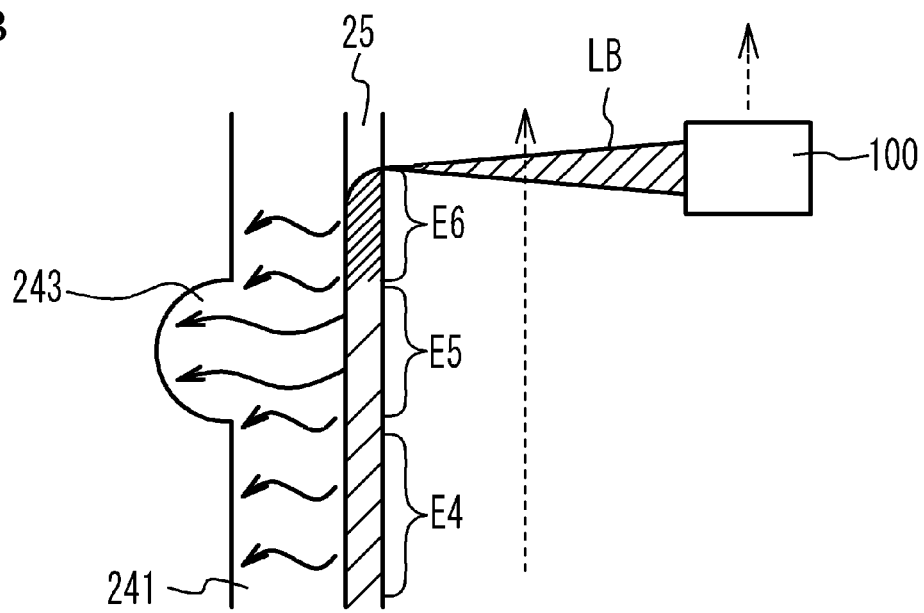

FIGS. 6A and 6B are explanatory views of an increase in the residual stress in the vicinity of the thick portion 243. In FIGS. 6A and 6B, the circumferential wall portion 24 and the inner circumferential groove portion 25 are linearly developed and illustrated. In FIGS. 6A and 6B, it is assumed that a laser irradiation apparatus 100 irradiating laser light LB is scanned from a lower side to an upper side to attach the melted metal powder on the inner circumferential groove portion 25 sequentially in one direction. In this case, heat of the melted material is absorbed by the inner circumferential groove portion 25, which reduces the temperature of the melted material in the order in which the melted material is attached on the inner circumferential groove portion 25. Therefore, in the case of FIG. 6A, parts E1 to E3 of the melted material are attached on the inner circumferential groove portion 25 in this order, and solidify in this order. Herein, the melted material tends to heat-shrink during the solidification process thereof, the shrinkage is restricted by the circumferential wall portion 24 of the cylinder head 20 as a base material. For this reason, after the melted material solidifies, residual stress is generated therein. Herein, since the parts E1 to E3 solidify in the order as described above, it is considered that residual stress having substantially the same magnitude in substantially the same direction is generated in each of the parts E1 to E3.

In contrast, as illustrated in FIG. 6B, when parts E4 to E6 of the melted material are attached on the inner circumferential groove portion 25 in this order so as to pass through the vicinity of the thick portion 243, the heat of the melted material in the part E5 closest to the thick portion 243 is further absorbed by the thick portion 243. For this reason, the part E5 may be cooled earlier than the part E4. Thus, the parts E5, E4, and E6 might solidify in this order. In this case, the part E5 solidifies early, and the residual stress toward the center of the part E5 is generated in the part E5, and after that, the residual stress downward is generated in the part E4. Therefore, residual stresses in opposite directions are generated in the boundary between the parts E5 and E4, and the residual stress in the vicinity of the part E5 is considered to be higher than the residual stress in the vicinity of each of the parts E4 and E6. For this reason, the residual stress R2 on the overlay welded portion 26 in the vicinity of each of the thick portions 243 and 243x is considered to be higher than the residual stress R1 on the overlay welded portion 26 at each position distant from the thick portions 243 and 243x.

Therefore, in the comparative example illustrated in FIG. 5B, the relatively low thermal stress H2 and residual stress R1 act on the overlay welded portion 26 at the 225 degrees position, but both the relatively high thermal stress H1 and residual stress R2 act on the overlay welded portion 26 at the 135 degrees position. Therefore, in the comparative example, the local stress concentrates on the overlay welded portion 26 at the 135 degrees position. In contrast, in the present embodiment illustrated in FIG. 5A, the relatively low thermal stress H2 and the relatively high residual stress R2 act on the overlay welded portion 26 at the 225 degrees position, and the relatively high thermal stress H1 and the relatively low residual stress R1 act on the overlay welded portion 26 at the 135 degrees position. Therefore, the stress on the overlay welded portion 26 at the 135 degrees position in the present embodiment is lower than the stress on the overlay welded portion 26 at the 135 degrees position in the comparative example.

As described above, in the present embodiment, the position on which the relatively high residual stress acts due to the thick portion 243 is separated away from the position on which the relatively high thermal stress acts, which disperses the stress on the overlay welded portion 26 as compared with the comparative example. This suppresses the local stress concentration on the overlay welded portion 26, which suppresses a decrease in the durability of the overlay welded portion 26 due to the local stress concentration.

Since the thick portion 243 is provided in the center side of the combustion chamber CC with respect to the line segment L1 in the present embodiment, the rigidity of the cylinder head 20 against the combustion pressure is ensured. In a case where the thick portion 243 is provided between the 0 degree position and the 90 degrees position or between the 270 degrees position and the 0 degree position, the high combustion pressure does not tend to act on the thick portion 243, which might not ensure the rigidity against the combustion pressure.

From the viewpoint of reducing the residual stress on the overlay welded portion while ensuring the rigidity against the combustion pressure, it is conceivable to design a uniform thickness of the entire circumference of the circumferential wall portion to be greater than the thickness of the above-described thin portion 241. However, the thickness increases over the entire circumference of the circumferential wall portion in this case, which might degrade the cooling performance of the cylinder head by the cooling water flowing in the water jacket formed around the circumferential wall portion. Further, the volume of the intake port 22 might be reduced, which might not ensure a desired combustion efficiency. Furthermore, the weight of the cylinder head might increase. In consideration of the above-described viewpoints, it is preferable to provide the thick portion 243 only in a part of the circumferential wall portion 24 as in the present embodiment.

Figure 7:
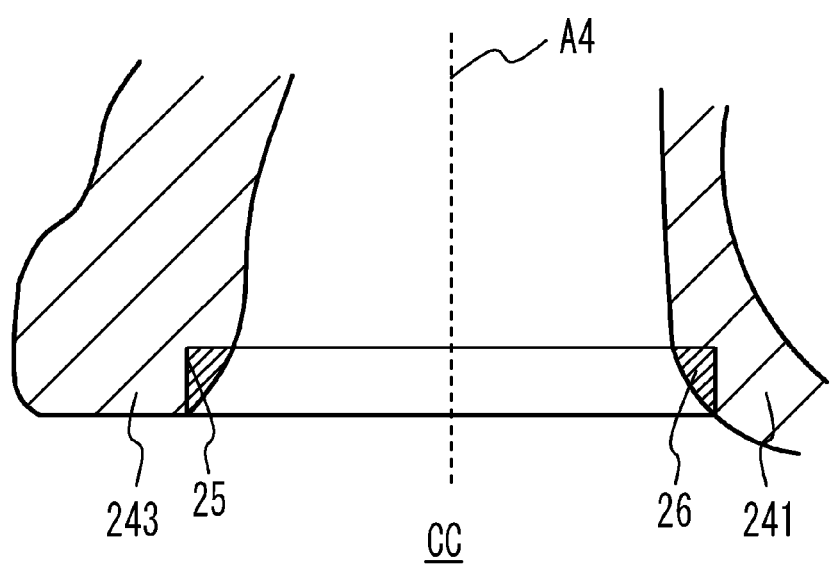
FIG. 7 is a cross-sectional view illustrating the thick portion and a thin portion of a circumferential wall portion in the present embodiment.

FIG. 7 is a cross-sectional view illustrating the thick portion 243 and the thin portion 241 of the circumferential wall portion 24 in the present embodiment. As illustrated in FIG. 7, the thick portion 243 also extends along the axis A4 in the direction away from the combustion chamber CC. For example, the thick portion 243 is formed along the axis A4 such that a length of a part of the circumferential wall portion 24 thicker than the thin portion 241 is greater than a width of the inner circumferential groove portion 25 in the direction of the axis A4. Therefore, the rigidity of the cylinder head 20 against the combustion pressure by the thick portion 243 is ensured, while suppressing an increase amount of the thickness of the thick portion 243 in the direction perpendicular to the axis A4 relative to the thickness of the thin portion 241 in the same direction. Further, since the thickness of the circumferential wall portion 24 in the thick portion 243 is suppressed in the vicinity of the combustion chamber CC, the cooling performance of the cylinder head 20 by the cooling water flowing in the water jacket formed around the circumferential wall portion 24 is ensured. From the above viewpoint, the length of the thick portion 243 along the axis A4 is preferably greater than the width of the inner circumferential groove portion 25 in the direction of the axis A4.

Although some embodiments of the present disclosure have been described in detail, the present disclosure is not limited to the specific embodiments but may be varied or changed within the scope of the present disclosure as claimed.

In the above embodiment, the circumferential wall portion 24 of the intake port 22 is described as an example, but the present disclosure is not limited to this. Instead of the thick portion 243 adapted to the circumferential wall portion 24 of the intake port 22, a thick portion may be adapted to the circumferential wall portion 34 of the exhaust port 32 at a similar position. In addition to the thick portion 243 adapted to the circumferential wall portion 24 of the intake port 22, a thick portion may be adapted to the circumferential wall portion 34 of the exhaust port 32 at a similar position. Further, the thick portion 243 may be adapted only to one of the two circumferential wall portions 24 of the two intake ports 22. A thick portion may be adapted only to one of the two circumferential wall portions 34 of the two exhaust ports 32. Since the temperature of the exhaust port 32 through which the exhaust gas flows tends to be higher than the temperature of the intake port 22, it is preferable to set the thick portion in the circumferential wall portion 24 of the intake port 22 without setting a thick portion in the circumferential wall portion 34 of the exhaust port 32, from the viewpoint of ensuring the cooling performance around the exhaust port 32 by the cooling water.

The internal combustion engine 1 according to the present embodiment is a gasoline engine equipped with an ignition plug, but is not limited thereto. For example, the internal combustion engine may be a diesel engine without an ignition plug.

What is claimed is:

1. A cylinder head for an internal combustion engine, comprising:
    first and second valves being intake valves or exhaust valves;
    a first circumferential wall portion defining a first port, the first port being opened and closed by the first valve and communicating with a combustion chamber; and
    a first overlay welded portion formed on the first circumferential wall portion and serving as a first valve seat on which the first valve is seated,
    wherein
    the first circumferential wall portion includes a first thick portion in which a thickness of the first circumferential wall portion in a radial direction is partially increased, and
    the first thick portion is located in a center side of the combustion chamber with respect to a first line segment passing through both axes of the first and second valves, and in an opposite side of the center side of the combustion chamber with respect to a second line segment orthogonal to the first line segment and passing through the axis of the first valve, when viewed in a direction of the axis of the first valve.

2. The cylinder head for the internal combustion engine of claim 1, wherein the first and second valves are the intake valves.

3. The cylinder head for the internal combustion engine of claim 1, further comprising:
    a second circumferential wall portion defining a second port, the second port being opened and closed by the second valve and communicating with the combustion chamber; and
    a second overlay welded portion formed on the second circumferential wall portion and serving as a second valve seat on which the second valve is seated,
    wherein
    the second circumferential wall portion includes a second thick portion in which a thickness of the second circumferential wall portion in a radial direction is partially increased, and
    the second thick portion is located in the center side of the combustion chamber with respect to the first line segment, and in an opposite side of the center side of the combustion chamber with respect to a third line segment orthogonal to the first line segment and passing through the axis of the second valve, when viewed in a direction of the axis of the second valve.

4. The cylinder head for the internal combustion engine of claim 1, wherein the first thick portion extends along the axis of the first valve in a direction away from the combustion chamber.

* * * * *